United States Patent
Kim et al.

(10) Patent No.: US 8,948,966 B2
(45) Date of Patent: Feb. 3, 2015

(54) HEAT PUMP SYSTEM FOR VEHICLE AND METHOD OF CONTROLLING THE SAME

(71) Applicants: Taeeun Kim, Daejeon-si (KR); Hakkyu Kim, Daejeon-si (KR); Saewon Oh, Daejeon-si (KR); Younwoo Lim, Daejeon-si (KR); Sangjun Yoo, Daejeon-si (KR); Jungjae Lee, Daejeon-si (KR); Youngho Choi, Daejeon-si (KR); Sungho Kang, Daejeon-si (KR); Jeonghun Seo, Daejeon-si (KR)

(72) Inventors: Taeeun Kim, Daejeon-si (KR); Hakkyu Kim, Daejeon-si (KR); Saewon Oh, Daejeon-si (KR); Younwoo Lim, Daejeon-si (KR); Sangjun Yoo, Daejeon-si (KR); Jungjae Lee, Daejeon-si (KR); Youngho Choi, Daejeon-si (KR); Sungho Kang, Daejeon-si (KR); Jeonghun Seo, Daejeon-si (KR)

(73) Assignee: Halla Climate Control Corporation, Daejeon-si (KR)

( * ) Notice: Subject to any disclaimer, the term of this patent is extended or adjusted under 35 U.S.C. 154(b) by 0 days.

(21) Appl. No.: 13/780,928

(22) Filed: Feb. 28, 2013

(65) Prior Publication Data
US 2013/0228324 A1    Sep. 5, 2013

(30) Foreign Application Priority Data

Mar. 2, 2012 (KR) .................. 10-2012-0021642
Feb. 27, 2013 (KR) .................. 10-2013-0020820

(51) Int. Cl.
| | |
|---|---|
| *G06F 7/00* | (2006.01) |
| *F25B 1/00* | (2006.01) |
| *B60H 1/00* | (2006.01) |
| *F25B 29/00* | (2006.01) |
| *B60H 1/22* | (2006.01) |
| *B60H 1/32* | (2006.01) |

(52) U.S. Cl.
CPC .......... *F25B 29/003* (2013.01); *B60H 1/00921* (2013.01); *B60H 1/2218* (2013.01); *B60H 1/3216* (2013.01); *B60H 2001/3238* (2013.01); *B60H 2001/3261* (2013.01); *B60H 2001/3272* (2013.01)
USPC .................................. 701/36; 62/498; 454/75

(58) Field of Classification Search
USPC ................................................ 701/36; 454/75
See application file for complete search history.

(56) References Cited

U.S. PATENT DOCUMENTS

| | | | |
|---|---|---|---|
| 5,669,226 A | 9/1997 | Kurahashi et al. | |
| 6,314,750 B1 | 11/2001 | Ishikawa et al. | |

(Continued)

FOREIGN PATENT DOCUMENTS

| | | | |
|---|---|---|---|
| DE | 10 2010 027 141 A1 | | 3/2011 |
| JP | 05-116526 A | | 5/1993 |
| JP | 05116526 A | * | 5/1993 |
| JP | 2003-002039 A | | 1/2003 |
| JP | 2003-025832 A | | 1/2003 |

(Continued)

*Primary Examiner* — Thomas G Black
*Assistant Examiner* — Tyler Paige
(74) *Attorney, Agent, or Firm* — James R. Crawford; Fulbright & Jaworski LLP (57) ABSTRACT

Disclosed therein are a heat pump system for a vehicle and a method of controlling the heat pump system, which variably controls only a compressor if the number of revolutions of the compressor is less than the upper limit of the number of the maximum revolutions of the compressor and operates an electric heater only when the number of revolutions of the compressor reaches the upper limit of the number of the maximum revolutions of the compressor in order to satisfy a target discharge temperature in a heat pump mode, thereby preventing that convergence of an air discharge temperature of the interior of the vehicle is deteriorated or becomes unstable when the compressor and the electric heater are variably controlled at the same time in order to satisfy the target discharge temperature.

12 Claims, 6 Drawing Sheets

(56) References Cited

U.S. PATENT DOCUMENTS

| | | | |
|---|---|---|---|
| 6,675,873 B2 * | 1/2004 | Ieda et al. | 165/43 |
| 2008/0041079 A1 * | 2/2008 | Nishijima et al. | 62/191 |
| 2010/0326127 A1 * | 12/2010 | Oomura et al. | 62/498 |
| 2010/0330895 A1 * | 12/2010 | Suetake et al. | 454/75 |
| 2011/0083450 A1 * | 4/2011 | Turner et al. | 62/56 |

FOREIGN PATENT DOCUMENTS

| | | | |
|---|---|---|---|
| JP | 2003326958 A | * | 11/2003 |
| JP | 2005186785 A | * | 7/2005 |
| JP | 2009-286226 A | | 12/2009 |
| JP | 2011075257 A | * | 4/2011 |
| JP | 2012076610 A | * | 4/2012 |

* cited by examiner

HEAT PUMP SYSTEM FOR VEHICLE AND METHOD OF CONTROLLING THE SAME

This application claims priority from Korean Patent Application Nos. 10-2012-0021642 filed Mar. 2, 2012 and 10-2013-0020820 filed Feb. 27, 2013, which are hereby incorporated by reference in their entireties.

BACKGROUND OF THE INVENTION

1. Field of the Invention

The present invention relates to a heat pump system for a vehicle and a method of controlling the same, and more particularly, to a heat pump system for a vehicle and a method of controlling the heat pump system, which variably controls only a compressor if the number of revolutions of the compressor is less than upper limit of the number of the maximum revolutions of the compressor and operates an electric heater only when the number of revolutions of the compressor reaches the upper limit of the number of the maximum revolutions of the compressor in order to satisfy a target discharge temperature in a heat pump mode, and which does not operate the compressor just by the number of the maximum revolutions of the compressor but differentiates the upper limit of the number of the maximum revolutions of the compressor according to conditions in the maximum heating mode.

2. Background Art

In general, an air conditioner for a vehicle includes a cooling system for cooling the interior of the vehicle and a heating system for heating the interior of the vehicle. At an evaporator side of a refrigerant cycle, the cooling system converts air into cold air by heat-exchanging the air passing outside an evaporator with refrigerant flowing inside the evaporator so as to cool the interior of the vehicle. At a heater core side of a cooling water cycle, the heating system converts air into warm air by heat-exchanging the air passing outside the heater core with cooling water flowing inside the heater core so as to heat the interior of the vehicle.

In the meantime, differently from the air conditioner for the vehicle, a heat pump system which can selectively carry out cooling and heating by converting a flow direction of refrigerant using one refrigerant cycle has been applied. For instance, the heat pump system includes two heat exchangers: one being an interior heat exchanger mounted inside an air-conditioning case for heat-exchanging with air blown to the interior of the vehicle; and the other one being an exterior heat exchanger for heat-exchanging outside the air-conditioning case, and a direction-adjustable valve for changing a flow direction of refrigerant. Therefore, according to the flow direction of the refrigerant by the direction-adjustable valve, the interior heat exchanger serves as a heat exchanger for cooling when the cooling mode is operated, and serves as a heat exchanger for heating when the heating mode is operated.

Figure 1:
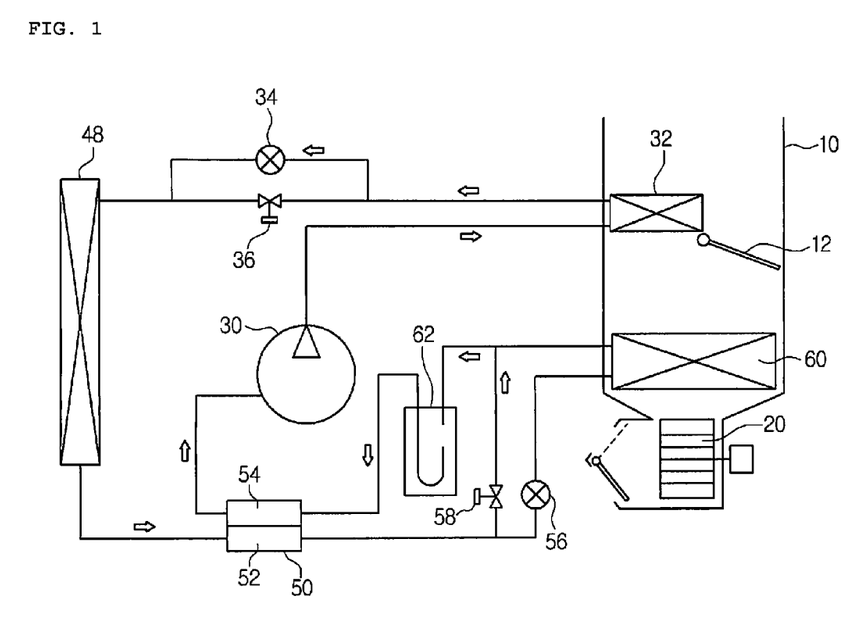
FIG. 1 is a configurative diagram of a heat pump system for a vehicle according to a prior art.

Various kinds of the heat pump system for the vehicle have been proposed, and FIG. 1 illustrates a representative example of the heat pump system for the vehicle.

As shown in FIG. 1, the heat pump system for the vehicle includes: a compressor 30 for compressing and discharging refrigerant; a high-pressure side heat exchanger 32 for radiating heat of the refrigerant discharged from the compressor 30; a first expansion valve 34 and a first bypass valve 36 mounted in parallel for selectively passing the refrigerant passing through the high-pressure side heat exchanger 32; an exterior heat exchanger 48 for heat-exchanging the refrigerant passing through the first expansion valve 34 or the first bypass valve 36 outdoors; a low-pressure side heat exchanger 60 for evaporating the refrigerant passing through the exterior heat exchanger 48; an accumulator 62 for dividing the refrigerant passing through the low-pressure side heat exchanger 60 into a gas-phase refrigerant and a liquid-phase refrigerant; an interior heat exchanger 50 for heat-exchanging refrigerant supplied to the low-pressure side heat exchanger 60 with refrigerant returning to the compressor 30; a second expansion valve 56 for selectively expanding the refrigerant supplied to the low-pressure side heat exchanger 60; and a second bypass valve 58 mounted in parallel with the second expansion valve 56 for selectively connecting an outlet side of the exterior heat exchanger 48 and an inlet side of the accumulator 62.

In FIG. 1, the reference numeral 10 designates an air-conditioning case in which the high-pressure side heat exchanger 32 and the low-pressure side heat exchanger 60 are embedded, the reference numeral 12 designates a temperature-adjustable door for controlling a mixed amount of cold air and warm air, and the reference numeral 20 designates a blower mounted at an inlet of the air-conditioning case.

Meanwhile, in order to secure the heating performance, an electric heater (not shown) is mounted inside the air-conditioning case 10.

According to the heat pump system having the above structure, when a heat pump mode (heating mode) is operated, the first bypass valve 36 and the second expansion valve 56 are closed, and the first expansion valve 34 and the second bypass valve 58 are opened. Moreover, the temperature-adjustable door 12 is operated as shown in FIG. 1. Accordingly, the refrigerant discharged from the compressor 30 passes through the high-pressure side heat exchanger 32, the first expansion valve 34, the exterior heat exchanger 48, a high pressure side 52 of the interior heat exchanger 50, the second bypass valve 58, the accumulator 62, and a low pressure side 54 of the interior heat exchanger 50 in order, and then, is returned to the compressor 30. That is, the high-pressure side heat exchanger 32 serves as a heater and the exterior heat exchanger 48 serves as an evaporator.

When an air-conditioning mode (cooling mode) is operated, the first bypass valve 36 and the second expansion valve 56 are opened, and the first expansion valve 34 and the second bypass valve 58 are closed. Furthermore, the temperature-adjustable door 12 closes a passage of the high-pressure side heat exchanger 32. Therefore, the refrigerant discharged from the compressor 30 passes through the high-pressure side heat exchanger 32, the first bypass valve 36, the exterior heat exchanger 48, the high pressure side 52 of the interior heat exchanger 50, the second expansion valve 56, the low-pressure side heat exchanger 60, the accumulator 62, and the low pressure side 54 of the interior heat exchanger 50 in order, and then, is returned to the compressor 30. That is, the low-pressure side heat exchanger 360 serves as an evaporator and the high-pressure side heat exchanger 32 closed by the temperature-adjustable door 12 serves as a heater in the same with the heat pump mode.

However, in order to satisfy a target discharge temperature, the conventional heat pump system for the vehicle variably controls the number of revolutions of the compressor 30 and a heat generation rate of the electric heater at the same time, and hence, the conventional heat pump system for the vehicle has a problem in that convergence of an air discharge temperature in the interior of the vehicle is deteriorated or becomes unstable due to the simultaneous variable control of the number of revolutions of the compressor 30 and the heat generation rate of the electric heater.

Additionally, the conventional heat pump system for the vehicle has another problem in that an operational noise of the compressor 30 is increased because the compressor 30 is operated just at the maximum revolutions in the maximum heating mode and it causes a passenger's dissatisfaction.

SUMMARY OF THE INVENTION

Accordingly, the present invention has been made to solve the above-mentioned problems occurring in the prior arts, and it is an object of the present invention to provide a heat pump system for a vehicle and a method of controlling the heat pump system, which variably controls only a compressor if the number of revolutions of the compressor is less than the upper limit of the number of the maximum revolutions of the compressor and operates an electric heater only when the number of revolutions of the compressor reaches the upper limit of the number of the maximum revolutions of the compressor in order to satisfy a target discharge temperature in a heat pump mode, thereby preventing that convergence of an air discharge temperature of the interior of the vehicle is deteriorated or becomes unstable when the compressor and the electric heater are variably controlled at the same time in order to satisfy the target discharge temperature.

It is another object of the present invention to provide a heat pump system for a vehicle and a method of controlling the heat pump system, which does not operate the compressor just by the number of the maximum revolutions of the compressor but differentiates the upper limit of the number of the maximum revolutions of the compressor according to conditions in the maximum heating mode, thereby reducing a passenger's dissatisfaction caused by a noise of the compressor and enhancing durability of the compressor and stability of the system.

To achieve the above objects, the present invention provides a method of controlling a heat pump system for a vehicle, comprising: a first step of receiving various sensor values of the vehicle and calculating a target discharge temperature; a second step of determining whether the air-conditioning mode or the heat pump mode is selected according to the target discharge temperature or a passenger's selection; a third step of calculating a deviation between the target discharge temperature and an air discharge temperature of the interior of the vehicle, when the heat pump mode is selected as the determination result of the second step; a fourth step of calculating the number of revolutions of a compressor by the deviation of the third step; a fifth step of determining whether or not the number of revolutions of the compressor is less than the upper limit of the number of the maximum revolutions of the compressor; a sixth step of variably controlling the compressor by the number of revolutions of the compressor according to the deviation calculated in the fourth step, if the number of revolutions of the compressor is less than the upper limit of the number of the maximum revolutions of the compressor as the determination result of the fifth step; a seventh step of determining whether or not the target discharge temperature is higher than the air discharge temperature of the interior of the vehicle, if the number of revolutions of the compressor is not less than the upper limit of the number of the maximum revolutions of the compressor as the determination result of the fifth step; and an eighth step of controlling the operation of an electric heater while keeping the operation of the compressor, if target discharge temperature is higher than the air discharge temperature of the interior of the vehicle as the determination result of the seventh step.

In another aspect of the present invention, the present invention provides a heat pump system for a vehicle comprising: a compressor connected to a refrigerant circulation line to compress and discharge refrigerant; an evaporator and an interior heat exchanger connected to the refrigerant circulation line and arranged inside an air-conditioning case; an exterior heat exchanger connected to the refrigerant circulation line and arranged outside the air-conditioning case; an electric heater mounted inside the air-conditioning case; and a controlling part receiving various sensor values of the vehicle and calculating a target discharge temperature so as to control the heat pump system, wherein in a heat pump mode, the controlling part variably controls the compressor by the number of revolutions of the compressor according to a deviation between the target discharge temperature and an air discharge temperature of the interior of the vehicle if the number of revolutions of the compressor calculated by the deviation is less than the upper limit of the number of the maximum revolutions of the compressor, and controls the operation of the electric heater while keeping the operation of the compressor if the number of revolutions of the compressor is equal to or more than the upper limit of the number of the maximum revolutions of the compressor and if the target discharge temperature is higher than the air discharge temperature of the interior of the vehicle.

As described above, the present invention can prevent that convergence of an air discharge temperature of the interior of the vehicle is deteriorated or becomes unstable when the compressor and the electric heater are variably controlled at the same time in order to satisfy the target discharge temperature, because the present invention variably controls only a compressor if the number of revolutions of the compressor is less than the upper limit of the number of the maximum revolutions of the compressor and operates an electric heater only when the number of revolutions of the compressor reaches the upper limit of the number of the maximum revolutions of the compressor in order to satisfy a target discharge temperature in a heat pump mode, thereby Moreover, the present invention can reduce a passenger's dissatisfaction caused by a noise of the compressor and enhance durability of the compressor and stability of the system because the present invention does not operate the compressor just by the number of the maximum revolutions of the compressor but differentiates the upper limit of the number of the maximum revolutions of the compressor according to conditions in the maximum heating mode.

Furthermore, the present invention does not need a complex calculation in consideration of variable external conditions because the present invention controls by setting the minimum value of the upper limits of the number of the maximum revolutions of the compressor according to factors, such as outdoor air temperature, refrigerant pressure, vehicle speed, air volume of the blower, the number of revolutions of a cooling fan of the exterior heat exchanger, and ON-OFF states of the driving source, as the upper limit of the number of the maximum revolutions of the compressor.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

First, a heat pump system for a vehicle according to the present invention is composed of a compressor 100, an interior heat exchanger 110, second expansion means 120, an exterior heat exchanger 130, first expansion means 140, and an evaporator 160 which are connected on a refrigerant circulation line (R) in order, and is preferably applied to electric vehicles or hybrid vehicles.

Moreover, on the refrigerant circulation line (R), a first bypass line (R1) bypassing the first expansion means 140 and the evaporator 160, a second bypass line (R2) bypassing the exterior heat exchanger 130, and an expansion line (R3) on which the second expansion means 120 is mounted are respectively connected in parallel. A first direction changing valve 191 is mounted at a branching point of the first bypass line (R1), a second direction changing valve 192 is mounted at a branching point of the second bypass line (R2), and a third direction changing valve 193 is mounted at a branching point of the expansion line (R3).

Furthermore, a branching line (R4) is mounted for connecting the refrigerant circulation line (R) of an outlet side of the first expansion means 140 and the first bypass line (R1) with each other, and a ON-OFF valve 195 is mounted on the branching line (R4).

Figure 2:
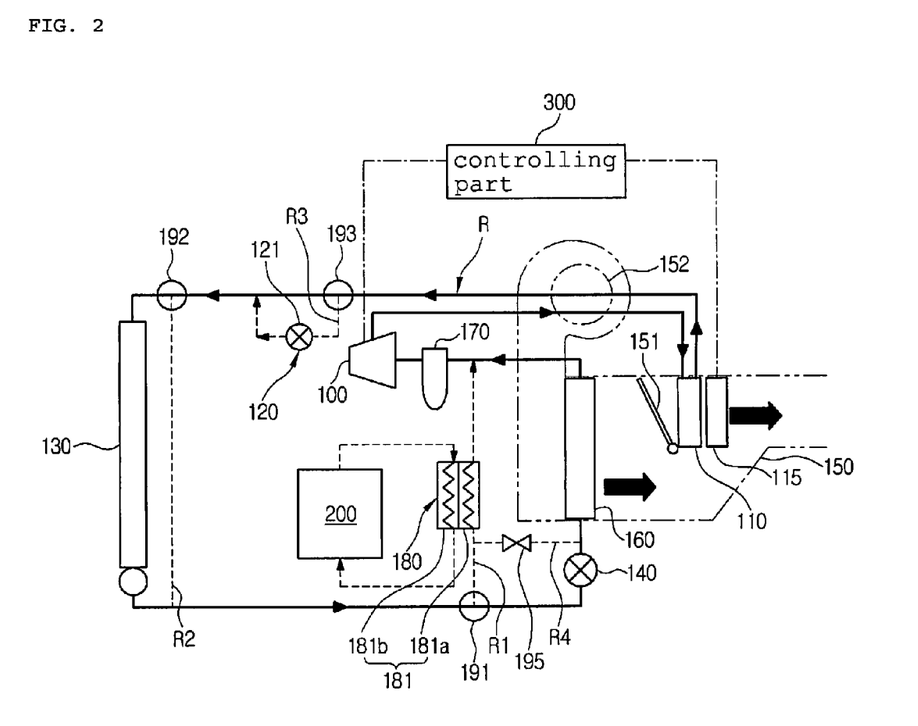
FIG. 2 is a configurative diagram of an air-conditioning mode of a heat pump system for a vehicle according to the present invention.

Therefore, in an air-conditioning mode, as shown in FIG. 2, the refrigerant discharged from the compressor 100 circulates through the interior heat exchanger 110, the exterior heat exchanger 130, the first expansion means 140, the evaporator 160, and the compressor 100 in order, and in this instance, the interior heat exchanger 110 serves as a condenser and the evaporator 160 serves as an evaporator.

Meanwhile, the exterior heat exchanger 130 also serves as a condenser like the interior heat exchanger 110.

Figure 3:
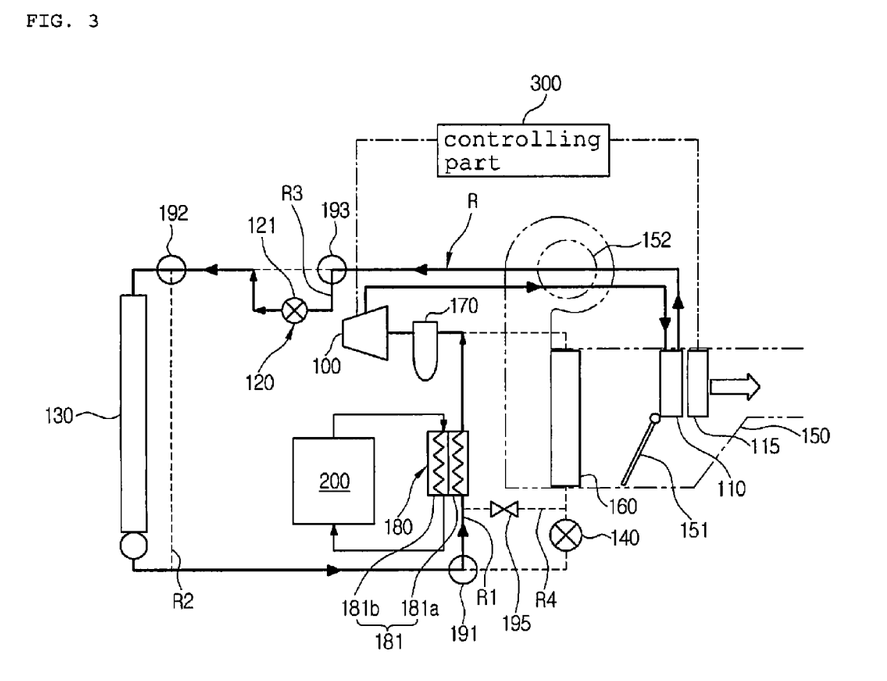
FIG. 3 is a configurative diagram of a first heating mode of a heat pump mode of the heat pump system for the vehicle according to the present invention.

In a heat pump mode (first heating mode), as shown in FIG. 3, the refrigerant discharged from the compressor 100 circulates through the interior heat exchanger 110, the second expansion means 120, the exterior heat exchanger 130, the first bypass line (R1), and the compressor 100 in order, and in this instance, the interior heat exchanger 110 serves as a condenser and the exterior heat exchanger 130 serves as an evaporator. The refrigerant is not supplied to the first expansion means 140 and the evaporator 160.

As described above, the heat pump system according to the present invention can communize the refrigerant circulation line (R) because circulation directions of refrigerant in the air-conditioning mode and the in the heat pump mode are the same, prevent stagnation of refrigerant which is generated when the refrigerant does not flow, and simplify the refrigerant circulation line (R).

In addition, in the present invention, the heat pump mode can be diversified like a first heating mode and a second heating mode.

In this instance, when the outdoor temperature is above the reference temperature, the first heating mode of the heat pump mode is carried out, but when the outdoor temperature is below the reference temperature, the second heating mode of the heat pump mode is carried out.

Here, when the outdoor temperature is above 0° C. (above zero), the first heating mode is carried out, but when the outdoor temperature is below 0° C. (below zero), the second heating mode is carried out.

Of course, the reference temperature of the outdoor temperature to divide the heat pump mode into the first heating mode and the second heating mode is not limited to 0° C., and may be changed according to purposes.

Moreover, in order to dehumidify the interior of the vehicle during the first or second heating mode, a dehumidification mode for supplying some of refrigerant to the evaporator 160 through the branching line (R4) is carried out.

Hereinafter, components of the heat pump system for the vehicle according to the present invention will be described in detail.

First, the compressor 100 mounted on the refrigerant circulation line (R) inhales and compresses refrigerant while operating by receiving a driving force from a driving source (an internal combustion engine, a motor, or others), and then, discharges the refrigerant in a gas phase of high-temperature and high-pressure.

The compressor 100 inhales and compresses the refrigerant discharged from the evaporator 160 and supplies to the interior heat exchanger 110 in the air-conditioning mode, and inhales and compresses the refrigerant discharged from the exterior heat exchanger 130 and passing through the first bypass line (R1) and supplies to the interior heat exchanger 110 in the heat pump mode.

The interior heat exchanger 110 is mounted inside the air-conditioning case 150 and connected with the refrigerant circulation line (R) of the outlet side of the compressor 100 so as to heat-exchange air flowing inside the air-conditioning case 150 with the refrigerant discharged from the compressor 100.

Furthermore, the evaporator 160 is mounted inside the air-conditioning case 150 and connected with the refrigerant circulation line (R) of the inlet side of the compressor 100 so as to heat-exchange the air flowing inside the air-conditioning case 150 with the refrigerant supplied to the compressor 100.

The interior heat exchanger 110 serves as a condenser all in the air-conditioning mode and the heat pump mode.

The evaporator 160 serves as an evaporator in the air-conditioning mode but is stopped in the heat pump mode because refrigerant is not supplied.

Additionally, the interior heat exchanger 110 and the evaporator 160 are spaced apart from each other at a predetermined interval inside the air-conditioning case 150, and in this instance, the evaporator 160 and the interior heat exchanger 110 are mounted in order from the upstream side of an air flow direction inside the air-conditioning case 150.

Accordingly, in the air-conditioning mode that the evaporator 160 serves as an evaporator, as shown in FIG. 2, the refrigerant of low-temperature and low-pressure discharged from the first expansion means 140 is supplied to the evaporator 160, and in this instance, the air flowing inside the air-conditioning case 150 through the blower (not shown) is converted into cold air by exchanging heat with the refrigerant of low-temperature and low-pressure of the evaporator 160 while passing through the evaporator 160, and then, is discharged to the interior of the vehicle to thereby cool the interior of the vehicle.

In the heat pump mode (first heating mode) that the interior heat exchanger 110 serves as a condenser, as shown in FIG. 3, the refrigerant of high-temperature and high-pressure discharged from the compressor 100 is supplied to the interior heat exchanger 110, and in this instance, the air flowing inside the air-conditioning case 150 through the blower (not shown) is converted into warm air by exchanging heat with the refrigerant of high-temperature and high-pressure of the interior heat exchanger 110 while passing through the interior heat exchanger 110, and then, is discharged to the interior of the vehicle to thereby heat the interior of the vehicle.

In the meantime, it is preferable that the evaporator 160 is larger than the interior heat exchanger 110.

Moreover, a temperature-adjustable door 151 for adjusting an amount of air bypassing the interior heat exchanger 110 and an amount of air passing through the interior heat exchanger 110 is mounted between the evaporator 160 and the interior heat exchanger 110 inside the air-conditioning case 150.

The temperature-adjustable door 151 adjusts the amount of the air bypassing the interior heat exchanger 110 and the amount of the air passing through the interior heat exchanger 110 to thereby properly control temperature of the air discharged from the air-conditioning case 150.

In this instance, in the air-conditioning mode, as shown in FIG. 2, when a front side passage of the interior heat exchanger 110 is completely closed by the temperature-adjustable door 151, because the cold air passing through the evaporator 160 bypasses the interior heat exchanger 110 and is supplied to the interior of the vehicle, the maximum heating is carried out. In the heat pump mode (first heating mode), as shown in FIG. 3, when a passage bypassing the interior heat exchanger 110 is completely closed by the temperature-adjustable door 151, because all of the air is converted into warm air while passing through the interior heat exchanger 110 serving as the condenser and the warm air is supplied to the interior of the vehicle, the maximum heating is carried out.

Furthermore, the exterior heat exchanger 130 is mounted outside the air-conditioning case 150 and connected with the refrigerant circulation line (R) so as to exchange heat between the refrigerant circulating the refrigerant circulation line (R) and the outdoor air.

Here, the exterior heat exchanger 130 is mounted at the front side of an engine room of the vehicle to exchange heat between the refrigerant flowing inside the exterior heat exchanger 130 and the outdoor air.

In the air-conditioning mode, the exterior heat exchanger 130 serves as a condenser like the interior heat exchanger 110, and in this instance, the refrigerant of high-temperature and high-pressure flowing inside the exterior heat exchanger 130 is condensed while heat-exchanging with the outdoor air. In the heat pump mode (first heating mode), the exterior heat exchanger 130 serves as an evaporator differently from the interior heat exchanger 110, and in this instance, refrigerant of low-temperature flowing inside the exterior heat exchanger 130 is evaporated while heat-exchanging with the outdoor air.

Additionally, the first expansion means 140 is mounted on the refrigerant circulation line (R) of the inlet side of the evaporator 160 and expands the refrigerant supplied to the evaporator 160.

In other words, in the air-conditioning mode, the first expansion means 140 expands the refrigerant discharged from the exterior heat exchanger 130 to make it in a liquid phase (wet saturated state) of low-temperature and low-pressure, and then, supplies the expanded refrigerant to the evaporator 160.

It is preferable that the first expansion means 140 has an expansion valve, but may have an orifice.

Moreover, the second expansion means 120 is mounted on the refrigerant circulation line (R) between the interior heat exchanger 110 and the exterior heat exchanger 130 so as to selectively expand the refrigerant supplied to the exterior heat exchanger 130 according to the air-conditioning mode or the heat pump mode.

The second expansion means 120 is mounted on the expansion line (R3) connected in parallel with the refrigerant circulation line (R) between the interior heat exchanger 110 and the exterior heat exchanger 130.

Here, it is preferable that the second expansion means 120 has an orifice 121, but may have an expansion valve.

Furthermore, at the branching point of the expansion line (R3) and the refrigerant circulation line (R), mounted is the third direction changing valve 193 for changing a flow direction of the refrigerant so that the refrigerant passing through the interior heat exchanger 110 passes the second expansion means 120 through the expansion line (R3) or bypasses the second expansion means (120) according to the air-conditioning mode or the heat pump mode.

Therefore, in the air-conditioning mode, the refrigerant discharged from the compressor 100 and passing through the interior heat exchanger 110 bypasses the second expansion means 120 and is supplied to the exterior heat exchanger 130 by the third direction changing valve 193. In the heat pump mode (first heating mode), the refrigerant discharged from the compressor 100 and passing through the interior heat exchanger 110 is expanded while passing through the expansion line (R3) and the second expansion means 120 and is supplied to the exterior heat exchanger 130 by the third direction changing valve 193.

Additionally, the first bypass line (R1) is mounted in such a way as to connect the refrigerant circulation line (R) of the inlet side of the first expansion means 140 and the refrigerant circulation line (R) of the outlet side of the evaporator 160 with each other, so that the refrigerant circulating through the refrigerant circulation line (R) selectively bypasses the first expansion means 140 and the evaporator 160.

As shown in the drawings, the first bypass line (R1) is arranged in parallel with the first expansion means 140 and the evaporator 160. That is, the inlet side of the first bypass line (R1) is connected with the refrigerant circulation line (R) which connects the exterior heat exchanger 130 and the first expansion means 140 with each other, and the outlet side is connected with the refrigerant circulation line (R) which connects the evaporator 160 and the compressor 100 with each other.

As a result, in the air-conditioning mode, the refrigerant passing through the interior heat exchanger 130 flows toward the first expansion means 140 and the evaporator 160, but, in the heat pump mode (first heating mode), the refrigerant passing through the exterior heat exchanger 130 directly flows toward the compressor 100 through the first bypass line (R1) and bypasses the first expansion means 140 and the evaporator 160.

Here, the change in flow direction of the refrigerant according to the air-conditioning mode and the heat pump mode is achieved by the first direction changing valve 191.

The first direction changing valve 191 is mounted at a branching point of the first bypass line (R1) and the refrigerant circulation line (R) so as to change the flow direction of the refrigerant in such a manner that the refrigerant passing through the exterior heat exchanger 130 flows toward the first bypass line (R1) or the first expansion means 140 according to the air-conditioning mode or the heat pump mode.

In this instance, in the air-conditioning mode, the first direction changing valve 191 changes the flow direction of the refrigerant in such a manner that the refrigerant discharged from the compressor 100 and passing through the interior heat exchanger 110 and the exterior heat exchanger 130 flows toward the first expansion means 140 and the evaporator 160, and in the heat pump mode (first heating mode), the first direction changing valve 191 changes the flow direction of the refrigerant in such a manner that the refrigerant discharged from the compressor 100 and passing through the interior heat exchanger 110, the second expansion means 120 and the exterior heat exchanger 130 flows toward the first bypass line (R1).

In the meantime, it is preferable that the first direction changing valve 191 is mounted at the branching point of the inlet side of the first bypass line (R1) and uses a three-way valve.

Besides the first direction changing valve 191, preferably, the second direction changing valve 192 and the third direction changing valve 193 use the three-way valves.

In addition, the second bypass line (R2) is mounted in parallel on the refrigerant circulation line (R) in such a manner that the refrigerant selectively passing the second expansion means 120 bypasses the exterior heat exchanger 130. In other words, the second bypass line (R2) is mounted to connect the refrigerant circulation lines (R) of the inlet and outlet sides of the exterior heat exchanger 130 so that the refrigerant circulating through the refrigerant circulation line (R) bypasses the exterior heat exchanger 130.

Moreover, at the branching point of the second bypass line (R2) and the refrigerant circulation line (R), mounted is the second direction changing valve 192 for converting the flow direction of the refrigerant in such a manner that the refrigerant flows toward the exterior heat exchanger 130 or the second bypass line (R2) according to the outdoor temperature.

In this instance, when the outdoor temperature is above zero, the refrigerant is controlled by the second direction changing valve 192 to flow toward the exterior heat exchanger 130, but when the outdoor temperature is below zero, the refrigerant is controlled by the second direction changing valve 192 to bypass the exterior heat exchanger 130 and flow toward the second bypass line (R2).

Figure 4:
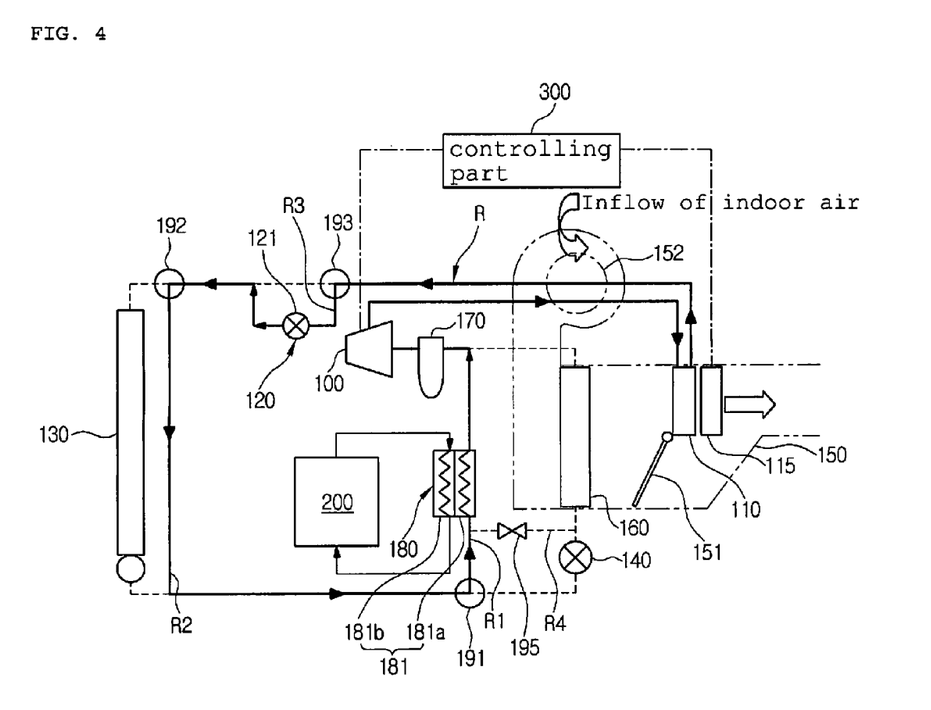
FIG. 4 is a configurative diagram of a second heating mode of a heat pump mode of the heat pump system for the vehicle according to the present invention.

In other words, in a low-temperature heat source condition that the outdoor temperature is below zero, in order to minimize an influence of the outdoor air of low temperature, as shown in FIG. 4 illustrating the second heating mode, the refrigerant passing the second expansion means 120 bypasses the exterior heat exchanger 130 and flows toward the second bypass line (R2).

Moreover, an electric heater 115 for enhancing a heating efficiency is further mounted at the downstream side of the interior heat exchanger 110 inside the air-conditioning case 150.

It is preferable that the electric heater 115 is a PTC heater.

Furthermore, heat supplying means 180 for supplying heat to the refrigerant flowing along the first bypass line (R1) is mounted on the first bypass line (R1).

In order to supply waste heat of electronic units 200 of the vehicle to the refrigerant flowing through the first bypass line (R1), the heat supplying means 180 includes a water cooling type heat exchanger 181, and the water cooling type heat exchanger 181 includes: a refrigerant heat-exchanging part 181a in which the refrigerant flowing through the first bypass line (R1) flows; and a cooling water heat-exchanging part 181b in which cooling water circulating through the electronic units 200 of the vehicle and which is disposed at one side of the refrigerant heat-exchanging part 181a in such a way as to heat-exchange.

Therefore, in the heat pump mode, the heat pump system according to the present invention can enhance the heating performance by recovering the heat source from the waste heat of the electronic units 200 of the vehicle.

Meanwhile, the electronic units 200 of the vehicle representatively are a motor, an inverter, and so on.

Moreover, in order to supply some of the refrigerant flowing toward the heat supplying means 180 along the first bypass line (R1) to the evaporator 160, a ranching line (R4) for connecting the first bypass line (R1) of the inlet side of the heat supplying means 180 and the refrigerant circulation line (R) of the inlet side of the evaporator 160 with each other is mounted, and the ON-OFF valve 195 for controlling the flow of the refrigerant is mounted on the branching line (R4).

If it is necessary to dehumidify the interior of the vehicle, namely, in the dehumidification mode, the ON-OFF valve 195 is opened, so that some of the refrigerant flowing toward the first bypass line (R1) recovers the waste heat of the electronic units 200 of the vehicle while passing through the water cooling type heat exchanger 181 by the first direction changing valve 191 and the remainder is dehumidified while passing the evaporator 160 through the branching line (R4).

So, the air flowing inside the air-conditioning case 150 is dehumidified while passing through the evaporator 160, and in other words, some of the refrigerant is supplied to the evaporator 160 through the branching line (R4) even in the heat pump mode like the first and second heating modes to thereby carry out dehumidification of the interior of the vehicle.

In the meantime, in the second heating mode which is operated under the condition that the outdoor temperature is below zero, in order to enhance the heating performance by recovering the heat source of the indoor air, it is preferable to convert an air inflow mode of the air-conditioning case 150 into an indoor air inflow mode to thereby introduce the indoor air into the air-conditioning case 150.

Furthermore, the accumulator 170 is mounted on the refrigerant circulation line (R) of the inlet side of the compressor 100.

The accumulator 170 divides the refrigerant to be supplied to the compressor 100 into the liquid-phase refrigerant and the gas-phase refrigerant and supplies only the gas-phase refrigerant to the compressor 100.

Additionally, a controlling part 300 is disposed to control the heat pump system according to the present invention. The controlling part 300 receives various sensor values of the vehicle and calculates a target discharge temperature so as to control the heat pump system.

For the various sensors, there are an outdoor air sensor, an indoor air sensor, a solar radiation sensor, a vehicle speed sensor, an evaporator sensor, an air discharge temperature sensor, a cooling water temperature sensor, and so on, and the values sensed from the sensors are transferred to the controlling part 300.

In the claims, it is described that the controlling part 300 receives various sensor values, but it is preferable that the controlling part 300 receives not only the sensor values but also all the information of the vehicle and passenger's selective values (set temperature, selection of mode, and others).

In the heat pump mode, if the number of revolutions of the compressor 100 calculated by a deviation between the target discharge temperature and an air discharge temperature of the interior of the vehicle is less than the upper limit of the maximum revolutions of the compressor 100, the controlling part 300 variably controls (automatically controls) the compressor 100 by the number of revolutions of the compressor 100 according to the deviation.

If the number of revolutions of the compressor 100 is equal to or more than the upper limit of the maximum revolutions of the compressor 100 and the target discharge temperature is higher than the air discharge temperature of the interior of the vehicle, the controlling part 300 operates and controls the electric heater 115 while keeping the operation of the compressor 100.

Here, the upper limit of the maximum revolutions of the compressor 100 is the minimum value out of the upper limits of the maximum revolutions of the compressor 100 according to factors, such as outdoor air temperature, refrigerant pressure, vehicle speed, air volume of the blower 152, the number of revolutions of a cooling fan of the exterior heat exchanger 130, and ON-OFF states of the driving source.

In other words, because the upper limit of the maximum revolutions of the compressor 100 is not set to the upper limit of the maximum revolutions of the compressor 100 according to the factors but set to the minimum value out of the upper limits of the maximum revolutions of the compressor 100 according to the factors, in the heat pump mode, even though the maximum heating is needed, the heat pump system according to the present invention can reduce the operational noise of the compressor 100 and also reduce passenger's dissatisfaction due to the operational noise, and in this instance, in relation with a shortage of heating, the electric heater 115 is operated.

Additionally, when the upper limit of the maximum revolutions of the compressor 100 is set to the minimum value of the upper limits of the maximum revolutions of the compressor 100 according to the factors, the number of revolutions of the compressor 100 is limited, and it can suppress an increase of discharge pressure of the compressor 100, enhance durability of the compressor 100, and enhance stability of the heat pump system.

Meanwhile, the refrigerant pressure is a discharge refrigerant pressure of the compressor 100.

Moreover, the upper limit of the number of the maximum revolutions of the compressor 100 is obtained through the following operation expression.

Upper limit of the number of the maximum revolutions of compressor (100)=Min (an upper limit of the number of the maximum revolutions of the compressor by refrigerant pressure, an upper limit of the number of the maximum revolutions of the compressor by vehicle speed, an upper limit of the number of the maximum revolutions of the compressor by the air volume of the blower, an upper limit of the number of the maximum revolutions of the compressor by the number of revolutions of the cooling fan of the exterior heat exchanger, and an upper limit of the number of the maximum revolutions of the compressor by the ON-OFF states of the driving source)

When the upper limit of the number of the maximum revolutions of the compressor 100 is calculated, if there is no signal in relation with some of the factors of the outdoor air temperature, the refrigerant pressure, the vehicle speed, the air volume of the blower 152, the number of revolutions of a cooling fan of the exterior heat exchanger 130, and the ON-OFF states of the driving source, the corresponding factors are excluded from the operation expression.

Additionally, it is preferable that the controlling part 300 maintains the number of revolutions of the compressor 100 to be the upper limit of the number of the maximum revolutions of the compressor 100 calculated above. In other words, the heat pump system according to the present invention can reduce the passenger's dissatisfaction due to noise generated by operation of the compressor 100 in the heat pump mode by differentiating the upper limits of the number of the maximum revolutions of the compressor 100 according to the conditions of the vehicle (refrigerant pressure, vehicle speed, air volume of the blower 152, the number of revolutions of the cooling fan of the exterior heat exchanger 130, and ON-OFF states of the driving source).

In addition, in the heat pump mode, the controlling part 300 operates and controls the electric heater 115 in the state where the controlling part 300 maintains the number of revolutions of the compressor 100 to be the upper limit of the number of the maximum revolutions of the compressor 100 only when the number of revolutions of the compressor 100 is equal to or more than the upper limit of the number of the maximum revolutions of the compressor 100 and the target discharge temperature is higher than the air discharge temperature of the interior of the vehicle. In this instance, when the operation of the electric heater 115 is controlled, the controlling part 300 variably controls (automatically controls) the electric heater 115 by calculating a heat generation rate of the electric heater 115 by the deviation between the target discharge temperature and the air discharge temperature of the interior of the vehicle.

That is, the controlling part 300 can variably control the heat generation rate of the electric heater 115 by calculating and controlling a duty ratio of electric voltage supplied to the electric heater 115. In this instance, when conditions for turning off the electric heater 115 is satisfied, for instance, temperature reaches the target discharge temperature through the control of the electric heater 115, only the electric heater 115 is turned off, and then, the number of revolutions of the compressor 100 is variably controlled.

In the meantime, in the air-conditioning mode, the controlling part 300 variably controls (automatically controls) the compressor 100 by calculating the number of revolutions of the compressor 100 by a deviation between the target temperature of the evaporator 160 and temperature of the evaporator 160.

As described above, because the present invention operates the electric heater 115 only when the number of revolutions of the compressor 100 reaches the upper limit of the number of the maximum revolutions of the compressor 100 in the heat pump mode, the present invention can solve the problem that convergence of the air discharge temperature of the interior of the vehicle is deteriorated or becomes unstable, which is generated when the compressor 100 and the electric heater 115 are variably controlled at the same time in order to satisfy the target discharge temperature.

Hereinafter, referring to FIGS. 5 and 6, a method of controlling the heat pump system according to the present invention will be described.

First, a first step (S1) of receiving various sensor values of the vehicle and calculating a target discharge temperature is carried out.

For the various sensors, there are an outdoor air sensor, an indoor air sensor, a solar radiation sensor, a vehicle speed sensor, an evaporator sensor, an air discharge temperature sensor, a cooling water temperature sensor, and so on, and the values sensed from the sensors are transferred to the controlling part 300.

In this instance, the controlling part 300 receives not only the sensor values but also all the information of the vehicle and passenger's selective values (set temperature, selection of mode, and others).

After the first step (S1), a second step (S2) of determining whether the air-conditioning mode or the heat pump mode is selected according to the target discharge temperature or the passenger's selection is carried out.

As the determination result of the second step (S2), when the heat pump mode is selected, a third step (S3) of calculating a deviation between the target discharge temperature and the air discharge temperature of the interior of the vehicle is carried out.

In this instance, the air discharge temperature of the interior of the vehicle is sensed by a temperature sensor (not shown) mounted at an outlet formed in the interior of the vehicle in order to supply the air discharged from the air-conditioning case 150 to the interior of the vehicle.

Continuously, after the third step (S3), a fourth step (S4) of calculating the number of revolutions of the compressor 100 by the deviation of the third step (S3) is carried out.

After the fourth step (S4), a fifth step (S5) of determining whether or not the number of revolutions of the compressor 100 is less than the upper limit of the number of the maximum revolutions of the compressor 100 is carried out.

Here, the upper limit of the maximum revolutions of the compressor 100 is set to the minimum value of the upper limits of the maximum revolutions of the compressor 100 according to the factors.

That is, the minimum value out of the upper limits of the maximum revolutions of the compressor 100 according to the factors sensed from the various sensors mounted on the vehicle is set as the upper limit.

For the factors, there are noise generation factors of the vehicle and protection factors of the heat pump system.

As the vehicle noise generation factors, there are vehicle speed, air volume of the blower 152, the number of revolutions of the cooling fan of the exterior heat exchanger 130, and ON-OFF states of the driving source.

That is, when the vehicle speed, the air volume of the blower 152, and the number of revolutions of the cooling fan are high or the driving source is in an ON state, the passenger does not feel dissatisfaction because the operational noise of the compressor 100 is heard less than noises of the factors.

However, when the vehicle speed, the air volume of the blower 152, and the number of revolutions of the cooling fan are low or the driving source is in an OFF state, the passenger may feel dissatisfaction because the operational noise of the compressor 100 is heard louder than noises of the factors.

Accordingly, when the upper limit of the maximum revolutions of the compressor 100 is set to the minimum value of the upper limits of the maximum revolutions of the compressor 100 by the vehicle noise generation factors, the operational noise of the compressor 100 is reduced and the passenger's dissatisfaction is also reduced.

Meanwhile, as the protection factors of the heat pump system, there are outdoor air temperature, and refrigerant pressure (discharge refrigerant pressure of the compressor).

As described above, the upper limit of the number of the maximum revolutions of the compressor 100 is the minimum value out of the upper limits of the number of the maximum revolutions of the compressor 100 according to the factors, such as outdoor air temperature, refrigerant pressure, vehicle speed, air volume of the blower 152, the number of revolutions of a cooling fan of the exterior heat exchanger 130, and ON-OFF states of the driving source.

In other words, because the upper limit of the maximum revolutions of the compressor 100 is not set to the upper limit of the maximum revolutions of the compressor 100 according to the factors but set to the minimum value out of the upper limits of the maximum revolutions of the compressor 100 according to the factors, in the heat pump mode, even though the maximum heating is needed, the heat pump system according to the present invention can reduce the passenger's dissatisfaction by reducing the operational noise of the compressor 100 and enhancing durability, and in this instance, in relation with a shortage of heating, the electric heater 115 is operated.

In the meantime, the upper limit of the number of the maximum revolutions of the compressor 100 is obtained through the following operation expression.

Upper limit of the number of the maximum revolutions of compressor (100)=Min (an upper limit of the number of the maximum revolutions of the compressor by refrigerant pressure, an upper limit of the number of the maximum revolutions of the compressor by vehicle speed, an upper limit of the number of the maximum revolutions of the compressor by the air volume of the blower, an upper limit of the number of the maximum revolutions of the compressor by the number of revolutions of the cooling fan of the exterior heat exchanger, and an upper limit of the number of the maximum revolutions of the compressor by the ON-OFF states of the driving source)

When the upper limit of the number of the maximum revolutions of the compressor 100 is calculated, if there is no signal in relation with some of the factors of the outdoor air temperature, the refrigerant pressure, the vehicle speed, the air volume of the blower 152, the number of revolutions of a cooling fan of the exterior heat exchanger 130, and the ON-OFF states of the driving source, the corresponding factors are excluded from the operation expression.

Continuously, as the determination result of the fifth step (S5), if the number of revolutions of the compressor 100 is less than the upper limit of the number of the maximum revolutions of the compressor 100, a sixth step (S6) of variably controlling (automatically controlling) the compressor 100 by the number of revolutions of the compressor 100 according to the deviation calculated in the fourth step (S4) is carried out.

In other words, in the heat pump mode, under the condition that there is no need to operate the number of revolutions of the compressor 100 by the upper limit of the number of the maximum revolutions of the compressor 100, in order to carry out heating, only the compressor 100 is variably controlled (automatically controlled) by the number of revolutions of the compressor 100 according to the deviation between the target discharge temperature and the air discharge temperature, and the electric heater 115 is not operated.

As the determination result of the fifth step (S5), if the number of revolutions of the compressor 100 is not less than the upper limit of the number of the maximum revolutions of the compressor 100, namely, if the number of revolutions of the compressor 100 is equal to or more than the upper limit of the number of the maximum revolutions of the compressor 100, a seventh step (S7) of determining whether or not the target discharge temperature is higher than the air discharge temperature of the interior of the vehicle is carried out.

In the seventh step (S7), it is determined that the target discharge temperature is higher than the air discharge temperature of the interior of the vehicle, and in this instance, it may be determined that the target discharge temperature is higher than the air discharge temperature+a predetermined value.

As the determination result of the seventh step (S7), if target discharge temperature is higher than the air discharge temperature of the interior of the vehicle, an eighth step (S8) of controlling the operation of the electric heater 115 while keeping the operation of the compressor 100 is carried out.

That is, in the heat pump mode, only when the number of revolutions of the compressor 100 reaches the upper limit of the number of maximum revolutions of the compressor 100, the electric heater 115 is operated and automatically controlled.

In this instance, when the operation of the compressor 100 is kept, it is preferable that the number of revolutions of the compressor 100 is kept to the upper limit of the number of the maximum revolutions of the compressor 100.

Here, referring to FIG. 6, an operational control of the electric heater 115 of the eighth step (S8) will be described in detail. When the operation of the electric heater 115 is controlled, a step (S8-1) of keeping the number of revolutions of the compressor 100 to the upper limit of the number of the maximum revolutions of the compressor 100 is carried out.

In other words, the number of revolutions of the compressor 100 is continuously kept to the upper limit of the number of the maximum revolutions of the compressor 100 calculated above.

After the step (S8-1), a step (S8-2) of calculating a heat generation rate of the electric heater 115 according to the deviation between the target discharge temperature and the air discharge temperature of the interior of the vehicle and variably controlling (automatically controlling) the electric heater 115 is carried out.

That is, the heat generation rate of the electric heater 115 can be variably controlled when the duty ratio of the electric voltage supplied to the electric heater 115 is calculated and controlled.

Continuously, after the step (S8-2), a step (S8-3) of determining whether or not conditions to turn off the electric heater 115 are satisfied is carried out.

That is, it is determined that conditions to turn off the electric heater 115, for instance are formed, for instance, temperature reaches the target discharge temperature through the variable control (automatic control) of the electric heater 115.

As the determination result of the step (S8-3), if the conditions to turn off the electric heater 115 are satisfied through the variable control (automatic control) of the electric heater 115, for instance, if temperature reaches the target discharge temperature, a step (S8-4) of turning off only the electric heater 115 is carried out.

In the step (S8-4), after only the electric heater 115 is turned off, the number of revolutions of the compressor 100 is variably controlled.

Figure 5:
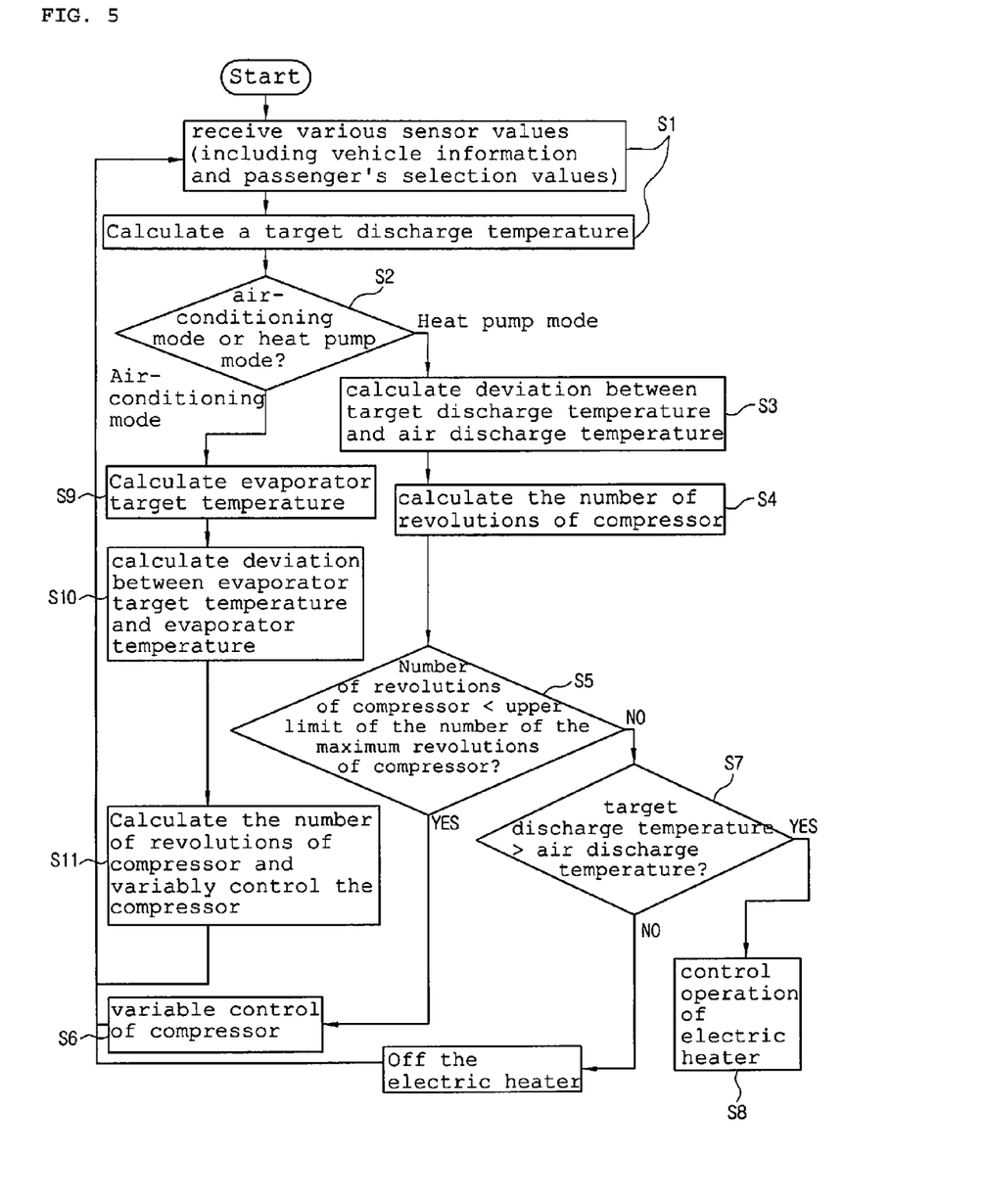
FIG. 5 is a flow chart showing a controlling method of the heat pump system according to the present invention.
Figure 6:
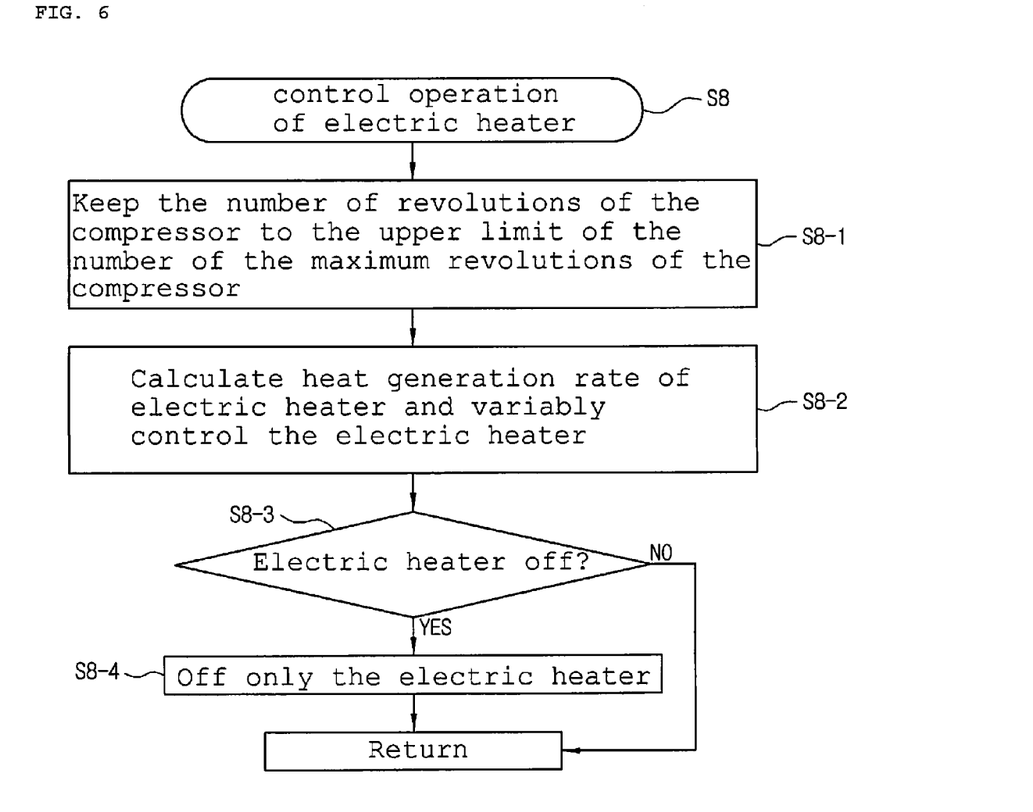
FIG. 6 is a flow chart showing a method of controlling an operation of an electric heater of the heat pump system according to the present invention.

After the step (S8-4), the process is returned to the Start of FIG. 5.

In the meantime, as the determination result of the seventh step (S7), if the target discharge temperature is not higher than the air discharge temperature of the interior of the vehicle, the electric heater 115 is continuously in the OFF state.

Moreover, as the determination result of the second step (S2), if the system is in the air-conditioning mode, a ninth step (S9) of calculating a target temperature of the evaporator 160 is carried out.

After the ninth step (S9), a tenth step (S10) of calculating a deviation between the target temperature of the evaporator 160 and the temperature of the evaporator 160 is carried out.

The temperature of the evaporator 160 is the surface temperature of the evaporator 160 sensed by a temperature sensor mounted on the evaporator 160.

After the tenth step (S10), an eleventh step S(11) of calculating the number of revolutions of the compressor 100 according to the deviation of the tenth step (S10) and variably controlling (automatically controlling) the compressor 100.

Hereinafter, the action of the heat pump system for the vehicle according to the present invention will be described, and in this instance, for convenience, only the air-conditioning mode, and the first and second heating modes of the heat pump mode will be described.

A. Air-Conditioning Mode (Cooling Mode) (See FIG. 2)

In the air-conditioning mode (cooling mode), as shown in FIG. 2, the first bypass line (R1) is closed by the first direction changing valve 191, the second bypass line (R2) is also closed by the second direction changing valve 192, and the third direction changing valve 193 closes the expansion line (R3).

Moreover, the cooling water circulating through the electronic units 200 is not supplied to the water cooling type heat exchanger 181 of the heat supplying means 180.

Meanwhile, in order to achieve the maximum cooling, the temperature adjustable door 151 inside the air-conditioning case 150 closes the passage passing through the interior heat exchanger 110, so that the air blown into the air-conditioning case 150 by the blower is cooled while passing through the evaporator 160 and is supplied to the interior of the vehicle by bypassing the interior heat exchanger 110 to thereby cool the interior of the vehicle.

Continuously, a refrigerant circulation process will be described.

The gas-phase refrigerant of high-temperature and high-pressure discharged after being compressed in the compressor 100 is supplied to the interior heat exchanger 110 mounted inside the air-conditioning case 150.

As shown in FIG. 2, the refrigerant supplied to the interior heat exchanger 110 directly flows to the exterior heat exchanger 130 without heat-exchanging with the air because the temperature adjustable door 151 closes the passage of the interior heat exchanger 110.

The refrigerant flowing to the exterior heat exchanger 130 is condensed while heat-exchanging with the outdoor air, and thereby, the gas-phase refrigerant is converted into the liquid-phase refrigerant.

In the meantime, all of the interior heat exchanger 110 and the exterior heat exchanger 130 serve as the condensers, but the refrigerant is mainly condensed in the exterior heat exchanger 130 which heat-exchanges with the outdoor air.

Continuously, the refrigerant passing through the exterior heat exchanger 130 is decompressed and expanded while passing through the first expansion means 140 to thereby become a liquid-phase refrigerant of low-temperature and low-pressure, and then, is introduced into the evaporator 160.

The refrigerant introduced into the evaporator 160 is evaporated by heat-exchanging with the air blown into the air-conditioning case 150 by the blower, and at the same time, cools the air due to a heat absorption by an evaporative latent heat of the refrigerant, and then, the cooled air is supplied to the interior of the vehicle to cool the interior.

After that, the refrigerant discharged from the evaporator 160 is introduced into the compressor 100 and recirculates the above cycle.

B. First Heating Mode of Heat Pump Mode (See FIG. 3)

The first heating mode of the heat pump mode is operated under the condition that the outdoor temperature is above zero, and uses the outdoor air and the waste heat of the electronic units 200 of the vehicle as a heat source. As shown in FIG. 3, the first bypass line (R1) is opened by the first direction changing valve 191, and the refrigerant is not supplied to the first expansion means 140 and the evaporator 160.

Moreover, the second bypass line (R2) is closed by the second direction changing valve 192, and the expansion line (R3) is opened by the third direction changing valve 193.

Meanwhile, the cooling water heated by the electronic units 200 of the vehicle is supplied to the cooling water heat-exchanging part 181b of the water cooling type heat exchanger 181 of the heat supplying means 180.

Furthermore, in the first heating mode, the temperature adjustable door 151 inside the air-conditioning case 150 closes the passage bypassing the interior heat exchanger 110, so that the air blown into the air-conditioning case 150 by the blower is changed into warm air while passing through the interior heat exchanger 110 after passing through the evaporator 160 which is stopped in operation, and then is supplied to the interior of the vehicle to heat the interior of the vehicle.

Continuously, a refrigerant circulation process will be described.

The gas-phase refrigerant of high-temperature and high-pressure discharged after being compressed in the compressor 100 is introduced into the interior heat exchanger 110 mounted inside the air-conditioning case 150.

The gas-phase refrigerant of high-temperature and high-pressure introduced into the interior heat exchanger 110 is condensed while heat-exchanging with the air blown into the air-conditioning case 150 by the blower, and in this instance, the air passing through the interior heat exchanger 110 is converted into warm air and supplied to the interior of the vehicle to thereby heat the interior of the vehicle.

Continuously the refrigerant discharged from the interior heat exchanger 110 moves to the expansion line (R3) by the third direction changing valve 193, and the refrigerant flowing to the expansion line (R3) is decompressed and expanded while passing through the second expansion means 120 to thereby become a liquid-phase refrigerant of low-temperature and low-pressure, and then, is supplied to the exterior heat exchanger 130 which serves as an evaporator.

The refrigerant supplied to the exterior heat exchanger 130 is evaporated while heat-exchanging with the indoor air and passes the first bypass line (R1) by the first direction changing valve 191. In this instance, the refrigerant passing the first bypass line (R1) heat-exchanges with the cooling water passing through the cooling water heat-exchanging part 181*b* while passing through the refrigerant heat-exchanging part 181*a* of the water cooling type heat exchanger 181 so as to recover the waste heat of the electronic units 200 of the vehicle, and then, is introduced into the compressor 100 to recirculate the above cycle.

C. Second Heating Mode of Heat Pump Mode (See FIG. 4)

The second heating mode of the heat pump mode is operated under the condition that the outdoor temperature is below zero, and uses the indoor air (indoor air introducing mode) and the waste heat of the electronic units 200 of the vehicle as a heat source. As shown in FIG. 4, the first bypass line (R1) is opened by the first direction changing valve 191, and the second bypass line (R2) is opened by the second direction changing valve 192.

Moreover, the branching line (R4) is closed by the ON-OFF valve 195, the expansion line (R3) is opened by the third direction changing valve 193, and the mode is converted into the indoor air introducing mode to introduce the indoor air into the air-conditioning case 150.

Meanwhile, the cooling water heated by the electronic units 200 of the vehicle is supplied to the cooling water heat-exchanging part 181*b* of the water cooling type heat exchanger 181 of the heat supplying means 180.

Furthermore, in the second heating mode, the temperature adjustable door 151 inside the air-conditioning case 150 closes the passage bypassing the interior heat exchanger 110, so that the air blown into the air-conditioning case 150 by the blower is changed into warm air while passing through the interior heat exchanger 110 after passing through the evaporator 160 which is stopped in operation, and then is supplied to the interior of the vehicle to heat the interior of the vehicle.

Continuously, a refrigerant circulation process will be described.

The gas-phase refrigerant of high-temperature and high-pressure discharged after being compressed in the compressor 100 is introduced into the interior heat exchanger 110 mounted inside the air-conditioning case 150.

The gas-phase refrigerant of high-temperature and high-pressure introduced into the interior heat exchanger 110 is condensed while heat-exchanging with the air blown into the air-conditioning case 150 by the blower, and in this instance, the air passing through the interior heat exchanger 110 is converted into warm air and supplied to the interior of the vehicle to thereby heat the interior of the vehicle.

Continuously the refrigerant discharged from the interior heat exchanger 110 moves to the expansion line (R3) by the third direction changing valve 193, and the refrigerant flowing to the expansion line (R3) is decompressed and expanded while passing through the second expansion means 120 to thereby become a liquid-phase refrigerant of low-temperature and low-pressure. After that, the refrigerant flows to the second bypass line (R2) and bypasses the exterior heat exchanger 130.

After that, the refrigerant passing through the second bypass line (R2) passes the first bypass line (R1) by the first direction changing valve 191. In this instance, the refrigerant passing the first bypass line (R1) heat-exchanges with the cooling water passing through the cooling water heat-exchanging part 181*b* while passing through the refrigerant heat-exchanging part 181*a* of the water cooling type heat exchanger 181 so as to recover the waste heat of the electronic units 200 of the vehicle, and then, is introduced into the compressor 100 to recirculate the above cycle.

What is claimed is:

1. A method of controlling a heat pump system for a vehicle, comprising:
    a first step of receiving various sensor values of the vehicle and calculating a target discharge temperature;
    a second step of determining whether the air-conditioning mode or the heat pump mode is selected according to the target discharge temperature or a passenger's selection;
    a third step of calculating a deviation between the target discharge temperature and an air discharge temperature of the interior of the vehicle, when the heat pump mode is selected as the determination result of the second step;
    a fourth step of calculating the number of revolutions of a compressor by the deviation of the third step;
    a fifth step of determining whether or not the number of revolutions of the compressor is less than the number of the maximum revolutions of the compressor;
    a sixth step of variably controlling the compressor by the number of revolutions of the compressor according to the deviation calculated in the fourth step, if the number of revolutions of the compressor is less than the number of the maximum revolutions of the compressor as the determination result of the fifth step;
    a seventh step of determining whether or not the target discharge temperature is higher than the air discharge temperature of the interior of the vehicle, if the number of revolutions of the compressor is not less than the number of the maximum revolutions of the compressor as the determination result of the fifth step; and
    an eighth step of controlling the operation of an electric heater while keeping the operation of the compressor, if target discharge temperature is higher than the air discharge temperature of the interior of the vehicle as the determination result of the seventh step, wherein the number of the maximum revolutions of the compressor is the minimum value out of the number of the maximum revolutions of the compressor according to factors of outdoor air temperature, refrigerant pressure, vehicle speed, air volume of a blower, the number of revolutions of a cooling fan of an exterior heat exchanger, and the ON-OFF states of a driving source.

2. The method of controlling the heat pump system according to claim 1, wherein the number of the maximum revolutions of the compressor is the minimum value out of the maximum revolutions of the compressor according to noise generation factors of the vehicle.

3. The method of controlling the heat pump system according to claim 1, wherein the number of the maximum revolutions of the compressor is the minimum value out of the maximum revolutions of the compressor according to protective factors of the heat pump system.

4. The method of controlling the heat pump system according to claim 2, wherein the noise generation factors are vehicle speed, air volume of the blower, the number of revolutions of the cooling fan of the exterior heat exchanger, and ON-OFF states of the driving source.

5. The method of controlling the heat pump system according to claim 3, wherein the protection factors of the heat pump system are outdoor air temperature, and refrigerant pressure.

6. The method of controlling the heat pump system according to claim 1, wherein in the eighth step, the number of revolutions of the compressor is maintained to the number of the maximum revolutions of the compressor in order to keep the operation of the compressor.

7. The method of controlling the heat pump system according to claim 1, wherein in order to control the operation of the electric heater, the eighth step comprises:
   a step of keeping the number of revolutions of the compressor to the number of the maximum revolutions of the compressor; and
   a step of calculating a heat generation rate of the electric heater according to the deviation between the target discharge temperature and the air discharge temperature of the interior of the vehicle and variably controlling the electric heater.

8. The method of controlling the heat pump system according to claim 7, wherein the eighth step further comprises:
   a step of determining whether or not conditions to turn off the electric heater are satisfied; and
   a step of turning off only the electric heater, if the conditions to turn off the electric heater are satisfied as the determination result of the step.

9. The method of controlling the heat pump system according to claim 1, further comprising:
   a ninth step of calculating a target temperature of an evaporator, if the system is in the air-conditioning mode as the determination result of the second step;
   a tenth step of calculating a deviation between the target temperature of the evaporator and the temperature of the evaporator; and
   an eleventh step of calculating the number of revolutions of the compressor according to the deviation of the tenth step and variably controlling the compressor.

10. A heat pump system for a vehicle comprising:
    a compressor connected to a refrigerant circulation line to compress and discharge refrigerant;
    an evaporator and an interior heat exchanger connected to the refrigerant circulation line and arranged inside an air-conditioning case;
    an exterior heat exchanger connected to the refrigerant circulation line and arranged outside the air-conditioning case;
    an electric heater mounted inside the air-conditioning case; and
    a controlling part receiving various sensor values of the vehicle and calculating a target discharge temperature so as to control the heat pump system,
    wherein in a heat pump mode, the controlling part variably controls the compressor by the number of revolutions of the compressor according to a deviation between the target discharge temperature and an air discharge temperature of the interior of the vehicle if the number of revolutions of the compressor calculated by the deviation is less than the number of the maximum revolutions of the compressor, and controls the operation of the electric heater while keeping the operation of the compressor if the number of revolutions of the compressor is equal to or more than the number of the maximum revolutions of the compressor and if the target discharge temperature is higher than the air discharge temperature of the interior of the vehicle, and
    wherein the number of the maximum revolutions of the compressor is the minimum value out of the number of the maximum revolutions of the compressor according to factors of outdoor air temperature, refrigerant pressure, vehicle speed, air volume of a blower, the number of revolutions of a cooling fan of an exterior heat exchanger, and the ON-OFF states of a driving source.

11. The heat pump system according to claim 10, wherein the controlling part maintains the number of revolutions of the compressor to the number of the maximum revolutions of the compressor so as to keep the operation of the compressor.

12. The heat pump system according to claim 10, wherein in order to control the operation of the electric heater, the controlling part calculates a heat generation rate of the electric heater according to the deviation between the target discharge temperature and the air discharge temperature of the interior of the vehicle and variably controls the electric heater while keeping the number of revolutions of the compressor to the number of the maximum revolutions of the compressor.

* * * * *

UNITED STATES PATENT AND TRADEMARK OFFICE
CERTIFICATE OF CORRECTION

| | |
|---|---|
| PATENT NO. | : 8,948,966 B2 |
| APPLICATION NO. | : 13/780928 |
| DATED | : February 3, 2015 |
| INVENTOR(S) | : Taeeun Kim et al. |

It is certified that error appears in the above-identified patent and that said Letters Patent is hereby corrected as shown below:

Title page

Item (73) replace Assignee with the following:

-- Halla Visterion Climate Control Corporation,
   Daejeon (KR) --.

Signed and Sealed this
Twenty-eighth Day of July, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,948,966 B2 | Page 1 of 1 |
| APPLICATION NO. | : 13/780928 | |
| DATED | : February 3, 2015 | |
| INVENTOR(S) | : Taeeun Kim et al. | |

It is certified that error appears in the above-identified patent and that said Letters Patent is hereby corrected as shown below:

Title page

Item (73) replace Assignee with the following:

-- Halla Visteon Climate Control Corporation,
Daejeon (KR) --.

This certificate supersedes the Certificate of Correction issued July 28, 2015.

Signed and Sealed this
Twenty-fourth Day of November, 2015

Michelle K. Lee
*Director of the United States Patent and Trademark Office*